Figure 1:
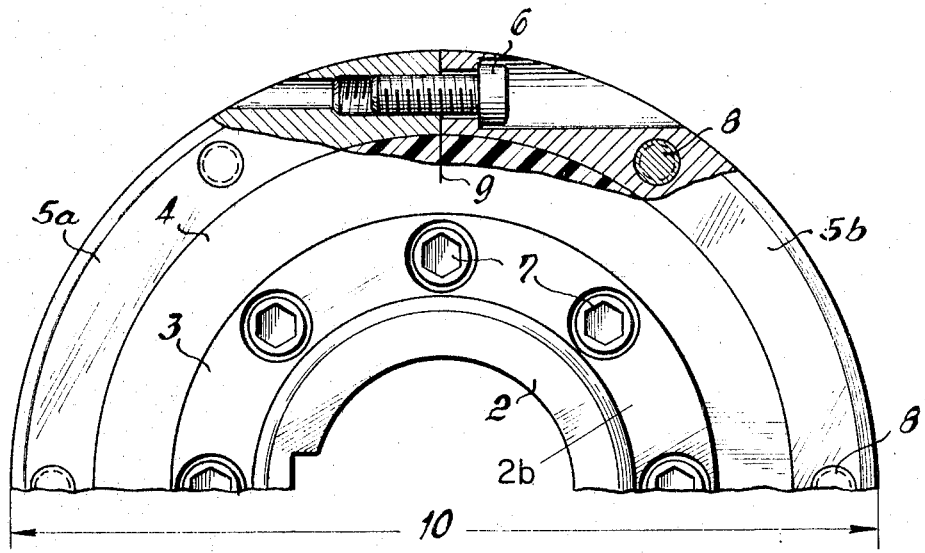

INVENTORS
Karl STÜBNER
Werner RÜGGEN

United States Patent Office 3,296,828
Patented Jan. 10, 1967

3,296,828
FLEXIBLE COUPLING HAVING TORQUE-TRANS-
MITTING UNIT RADIALLY INSERTABLE BE-
TWEEN FLANGES OF HUB MEMBERS
Karl Stübner, Unna, and Werner Rüggen, Holzwickede,
Germany, assignors to Maschinenfabrik Stromag
G.m.b.H., Unna, Germany
Filed July 1, 1965, Ser. No. 468,808
Claims priority, application Germany, July 2, 1964,
M 61,597
9 Claims. (Cl. 64—11)

This invention relates to flexible couplings for transmitting torques from a driving shaft to a coaxially arranged driven shaft. The term flexible coupling implies that the coupling allows some deviations of the shafts which are coupled from their normal positions in radial direction, or in axial direction, or in any other direction enclosing an angle with either of the two aforementioned directions. The flexible torque-transmitting part in a flexible coupling tends to eliminate undesirable oscillations of the shafts which are coupled by it, particularly rotary oscillations thereof, and tends to smooth-out sudden changes in the torque which is being transmitted.

For all these desirable features flexible couplings are widely applied in industrial as well as in vehicular drives. Present-day flexible couplings are, however, subject to a number of limitations, and drawbacks.

It is, therefore, a general object of this invention to provide novel and improved flexible couplings.

A more specific object of this invention is to provide flexible couplings adapted to transmit large torques, to have a minimum of bulk, and to be made-up of relatively few rugged parts which can be readily assembled and disassembled in the field without the need of moving the shafts which are intended to be coupled in a direction longitudinally thereof when assembling and disassembling the couplings.

The simplest flexible couplings which have been evolved include an annular member of an elastomer, e.g., vulcanized rubber, which may be circular, or in the shape of a polygon, and provided with a plurality of axially extending perforations, or holes, for receiving axially extending torque-transmitting studs or bolts. The even numbered studs, or bolts, may be connected positively to, or be integral with, the driving shaft, and the odd numbered studs or bolts may be connected positively to, or be integral with, the driven shaft, or vice versa. Flexible couplings of this description are widely used in automotive applications since they are inexpensive to manufacture and allow limited disalignments of the shaft which are coupled by them, i.e., they perform in the fashion of universal joints. Another significant advantage of these flexible couplings consists in that they can be installed and removed from their operating position without the need of axially separating the two shafts co-operating the particular coupling. This is true in regard to the initial assembly of a drive mechanism as well as in regard to any assembly and disassembly thereof for purposes of maintenance and repair. Flexible couplings of the aforementioned description do not lend themselves to transmission of relatively large blocks of power, unless designed to have excessive diameters.

It is, therefore, another object of this invention to provide novel improved flexible couplings having all the advantages of the aforementioned prior-art couplings but not subject to the main limitation thereof, i.e., it is another object of this invention to provide compact couplings which lend themselves to transmission of relatively large blocks of power.

Prior-art couplings of the aforementioned description do not include means for balancing the rotary parts thereof, and the problem of unbalance becomes increasingly serious the larger the blocks of power to be transmitted, the larger the dimensions of the coupling, and the higher the number of revolutions of the shafts to be coupled by the coupling.

It is, therefore, another object of this invention to provide flexible couplings which are perfectly balanced, or perfectly centered, and which may be as readily assembled as the aforementioned prior art couplings which are not centered, and tend to be out of balance.

Another class of prior art couplings comprises a radially inner torque-transmitting ring arranged coaxially to, and integral with, one of the shafts to be coupled, a radially outer torque-transmitting ring arranged coaxially to, and integral with, the other of the shafts to be coupled, and a ring of an elastomer, e.g., vulcanized rubber, filling the space between said radially outer ring and said radially inner ring, and transmitting torque from said radially inner ring to said radially outer ring, or vice versa. Such couplings lend themselves to transmission of relatively large blocks of power, and large torques. They operate quietly, have a small bulk, have a long life and may be used for drives having very high numbers of revolution. Their radially outer or radially inner torque-transmitting rings can readily be centered by appropriate centering means, thus avoiding the problem of unbalance. Prior art couplings of the aforementioned description are, however, difficult to install and to remove from the drive with which they are associated. To be more specific, the assembly thereof requires that at least one of the pair of shafts to be coupled be moved, or shifted, in a direction longitudinally thereof to temporarily increase the spacing between the pair of shafts to be coupled. Upon insertion of the composite torque-transmitting ring structure between the pair of shafts to be coupled a second shift of at least one of the pair of shafts is necessary to reduce the axial spacing between the pair of shafts. This complex operation is required when the coupling is initially installed as well as when the coupling is subsequently disassembled and re-assembled for purposes of maintenance and repair. In some instances the shaft to be shifted in a direction longitudinally thereof forms an integral part of a piece of heavy machinery which then must be shifted jointly with the shafts to be coupled any time the flexible coupling is being assembled and any time the flexible coupling is being disassembled. This is a very serious drawback of the aforementioned prior art couplings.

It is, therefore, another object of this invention to provide flexible couplings having the desirable structural features and the desirable performance characteristics of the aforementioned flexible prior art couplings, but are not subject to the critical drawback thereof, i.e., it is another object of this invention to provide flexible couplings which may readily be assembled and disassembled and to not require for the processes of their assembly and disassembly any axial shifting of either of the shafts.

Other objects of the invention and advantages thereof will, in part, be obvious and in part appear hereinafter.

Figure 2:
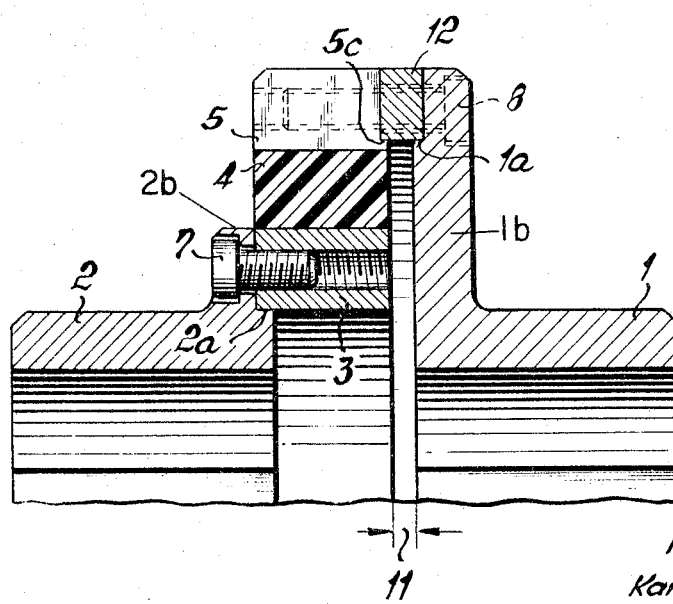

For a more complete understanding of the invention reference may be had to the following description thereof taken in connection with the accompanying drawings, in which:

FIG. 1 is an end view of a flexible coupling embodying the present invention showing some details thereof sectionalized transversely; and FIG. 2 is a longitudinal section of the structure of FIG. 1.

Referring now to the drawings, numeral 1 has been applied to indicate a hub number having a longitudinal geometrical axis and a flange 1b at right angles to said axis. Hub member 1 is intended to be mounted on a shaft (not shown) and keyed to the latter. Reference numeral 2 has been applied to designate another hub member having a longitudinal geometrical axis and arranged in coaxial relation to hub member 1. Hub member 2 is intended to be mounted on a shaft (not shown) and to be keyed to the latter. Hub member 2 is provided with a flange 2b defining a circular centering shoulder 2a having a predetermined depth in axial direction. Flange 2b of hub member 2 further defines a plurality of axially extending angularly displaced holes of which each receives a machine screw 7. The flanges 1b, 2b of hub members 1 and 2 have a predetermined axial spacing. The flange 1b of hub member 1 defines a circular centering shoulder 1a similar to the circular centering shoulder on flange 2b of hub member 2. The flange 1b of hub member 1 further defines a plurality of axially extending angularly displaced holes of which each receives a machine screw or screw threaded stud 8. The transmission of torque from hub member 1 to hub member 2, or vice versa, is effected by means of a coupling unit made up of three parts 3, 4, 5. The axial length of coupling unit 3, 4, 5 is less than the axial spacing between flanges 1b and 2b to allow coupling unit 3, 4, 5 to be inserted radially into the gap formed between flanges 1b, 2b, or the space bounded by flanges 1b, 2b. Reference numeral 3 has been applied to indicate a relatively rigid radially inner torque-transmitting ring engaging the centering shoulder 2a on flange 2b of hub member 2. Torque-transmitting ring 3 defines a plurality of axially extending angularly displaced holes in registry with the aforementioned plurality if axially extending angularly displaced holes in flange 2b of hub member 2. The holes in torque transmitting ring 3 are internally screw threaded and their threads are cooperatively engaged by machine screws 7. Reference numeral 4 has been applied to indicate an intermediate torque-transmitting ring made of an elastomer, e.g. natural or synthetic vulcanized rubber. The radially inner surface of rubber ring 4 may be cemented or vulcanized to the radially outer surface of ring 3, thus precluding ring 4 to slide relative to and revolve around ring 3.

As an alternative, relative movement of rings 3 and 4 may be avoided by roughening the engaging surface of both rings to establish a high degree of friction between the engaging surface of rins 3, 4. Ring 3 is preferably provided with radial slots 9 which extend only across a portion of the width of ring 4 in radial direction, and are closed, as shown in FIG. 1, when ring 4 is compressed by circumferential forces. Slots 9 widen when ring 4 is decompressed. Then slots 9 are substantially V-shaped, having a radially outer open end and a radially inner closed end radially spaced from the radially inner surface of ring 4 in physical engagement with the radially outer surface of ring 3. Reference numeral 5 has been applied to indicate a radially outer torque-transmitting ring made up of a pair of separate ring segments 5a, 5b, as clearly shown on the top of FIG. 1. The radially inner surface of ring 5 may be vulcanized to the radially outer surface of ring 4. Ring 5 defines a plurality of axially extending angularly displaced holes arranged in registry with the aforementioned plurality of holes defined by flange 1b of hub member 1. Screw-threaded studs or machine screws 8 project through the registering holes in ring 5 and flange 1b. Reference numeral 6 has been applied to indicate screw-threaded studs or machine screws arranged at the junction of ring segments 5a, 5b and extending in a direction tangentially to ring 5 at the aforementioned junction. Screws 6 join the separate segments 5a, 5b of ring 5 and compress rubber ring 4 to close the V-shaped slot 9 therein, as shown in FIG. 1. Reference numeral 12 has been applied to indicate circular spacer means, e.g. spacers in the shape of sectors of a ring, arranged in the gap formed between ring 5 and flange 1b. Spacer means 12 engage on one side thereof the circular centering shoulder 1a defined by flange 1b and engage on the other side thereof a circular centering shoulder 5c defined by ring 5. Shoulder 1a, spacer means 12 and shoulder 5c defined by ring 5 form a means for centering unit 3, 4, 5 in regard to hub member 1 and the shaft (not shown) upon which the latter may be mounted. Spacer means 12 are provided with axially extending angularly displaced holes in registry with the axially extending holes in ring 5 and in flange 1a, and screws 8 project transversely through flange 1b, spacer means 12 and ring 5. Thus screws 8 secure coupling unit 3, 4, 5 to hub member 1, while screws 7 secure said coupling unit to hub member 2. Screws 8 further serve the purpose of maintaining in position the spacer means 12.

FIG. 1 shows only the upper portion of a coupling embodying this invention, and it will be readily understood that the lower portion thereof is substantially identical to the upper portion shown in FIG. 1. Thus the lower portion of the coupling includes another clamping screw arranged substantially identically to clamping screw 6 shown on the top of FIG. 1, and the lower portion of ring 4 defines a substantially V-shaped slot, or void, substantially identical to the slot 9 shown on the top of FIG. 1.

It will be noted from FIG. 1 that the gaps 9 formed in ring 4 are arranged along the same radius which separates segments or parts 5a, 5b of ring 5 from one another.

Reference numeral 10 has been applied to indicate the outer diameter of ring 5 formed of ring segments 5a, 5b. As long as the screws 6 are not tightened, the width of ring 5 is equal to diameter 10 plus the width of the V-shaped gaps 9 formed in ring 4. Upon tightening of screws 6 the width of V-shaped gaps 9 is reduced to zero, and the width of the ring 5 becomes equal to diameter 10. Tightening of screws 6 pre-stresses ring 5 which increases its life and allows transmission of relatively large torques by means of the coupling.

Rings 3, 4, 5 form a sub-assembly unit which may be inserted radially between flanges 1b, 2b and then slightly shifted axially from right to left, as seen in FIG. 2, to engage centering shoulder 2a. A clearance 11 is left between flange 1b and toroidal torque-transmitting unit 3, 4, 5. Finally the gap left between flange 1b and ring 5 is closed by insertion of ring-sector-shaped spacers 12. It will be understood that in order to be able to assemble the constituent parts of the coupling in the above stated fashion the axial clearance 11 must exceed the depth of shoulder 2a in axial direction.

While, in accordance with the patent statutes, we have disclosed the specific details of one embodiment of the invention, it is to be understood that these details are merely illustrative, and that many variations thereof may be made without departing from the spirit and scope of the invention. It is our desire, therefore, that the language of the accompanying claims be interpreted as broad as possible, and that it be limited only as required by the state of the art.

We claim as our invention:

1. A flexible coupling comprising in combination:
   (a) a pair of coaxial rotatable members having a predetermined axial spacing, one of said pair of members being provided on one side thereof juxtaposed to the other of said pair of members with circular centering means having a predetermined depth in axial direction;
   (b) a torque-transmitting unit arranged coaxially to said pair of members for transmission of torques between said pair of members, said unit having an axial length less than said predetermined axial spacing between said pair of members to allow radial insertion of said unit into the space bounded by said pair of members, said unit including a pair of coaxial substantially rigid radially spaced torque-transmitting rings and said unit further including an intermediate torque-transmitting ring of an elastomer transmitting torques from one of said pair of rings to the other of said pair of rings, one of said pair of rings cooperatively engaging end centering means on one of said pair of members to center said unit in regard to said one of said pair of members, the other of said pair of rings having an axial spacing from said other of said pair of members in excess of said depth in axial direction of said centering means on said one of said pair of members;

(c) spacer means arranged inside of a gap formed between said other of said pair of members and said other of said pair of rings; and (d) fastener means firmly holding said spacer means in the position thereof.

2. A flexible coupling comprising in combination:

(a) a first rotatable member having a longitudinal axis, a flange substantially at right angles to said axis and centering means on one side of said flange;

(b) a second rotatable member having a longitudinal axis arranged in coaxial relation to the longitudinal axis of said first member, said second member having a flange substantially at right angles to said axis of said first member and second member and having a predetermined axial spacing from said flange of said first member;

(c) a toroidal torque-transmitting coupling unit arranged in coaxial relation to said first member and second member and interposed between said first member and said second member, said unit having an axial length less than said predetermined spacing to allow said unit to be radially inserted into the space bounded by said flange of said first member and said flange of said second member, said unit being made up of a radially inner substantially rigid torque-transmitting ring secured to said flange of said first member and cooperating with said centering means on said flange of said first member to center said unit in regard to said first member, an intermediate circumferentially compressible torque-transmitting ring of an elastomer under compression and a radially outer substantially rigid radially slotted torque-transmitting ring having a predetermined axial spacing from said flange of said second member; and (d) circular spacer means arranged in the gap formed between said flange of said second member and said radially outer ring and maintained in position by a plurality of axially extending screws projecting transversely through said flange of said second member, said spacer means and said radially outer ring.

3. A flexible coupling comprising in combination:

(a) a first rotatable member having a longitudinal axis, a flange substantially at right angles to said axis and centering means on one side of said flange;

(b) a second rotatable member having a longitudinal axis arranged in coaxial relation to the longitudinal axis of said first member, said second member having a flange at right angles to said axis of said first member and second member and having a predetermined axial spacing from said flange of said first member, said flange of said second member having centering means on the side thereof juxtaposed to said flange of said first member;

(c) a toroidal torque-transmitting coupling unit interposed between said first member and said second member, said coupling unit having an axial length less than said predetermined spacing to allow said coupling unit to be inserted radially into the space bounded by said flange of said first member and said flange of said second member, said coupling unit including a radially inner substantially rigid torque-transmitting ring secured to said flange of said first member and cooperating with said centering means on said flange of said first member to center said torque-transmitting unit in regard to said first member, an intermediate circumferentially compressible torque-transmitting ring of an elastomer under compression, and a radially outer substantially rigid radially slotted torque-transmitting ring having a predetermined axial spacing from said flange of said second member and centering means on the surface thereof juxtaposed to said flange of said second member; and (d) circular spacer means filling a gap formed between said radially outer ring and said flange of said second member cooperating with said centering means on said radially outer ring and cooperating with said centering means on said flange of said second member to center said unit in regard to said second member, said spacer means being maintained in position by a plurality of screws projecting transversely through said flange of said second member, said spacing means and said radially outer ring.

4. A flexible coupling comprising in combination:

(a) a first hub member including an end surface defining a circular centering shoulder having a predetermined depth in axial direction;

(b) a second hub member arranged in coaxial relation to said first hub member and including an end surface juxtaposed to said end surface of said first hub member, said end surface of said second hub member having a predetermined axial spacing from said end surface of said first hub member;

(c) a coupling unit for torque-transmission between said first hub member and said second hub member, said unit having an axial length less than said predetermined axial spacing of said end surface of said first hub member from said end surface of said second hub member to allow said unit to be inserted in radial direction into a gap formed between said end surface of said first hub member and said end surface of said second hub member, said unit including a radially inner torque-transmitting ring attached to said first hub member and engaging said centering shoulder defined by said first hub member, an intermediate circumferentially compressible torque-transmitting ring of an elastomeric substance and a radially outer torque-transmitting ring having an axial spacing from said end surface of said second hub member exceeding said predetermined depth in axial direction of said circular shoulder defined by said end surface of said first hub member; and (d) circular axial spacer means arranged between said second hub member and said radially outer ring.

5. A flexible coupling comprising in combination:

(a) a first hub member including an end surface defining a circular centering shoulder having a predetermined depth in axial direction;

(b) a second hub member arranged in coaxial relation to said first hub member and including an end surface juxtaposed to said end surface of said first hub member and defining a circular centering shoulder, said end surface of said second hub member having a predetermined axial spacing from said end surface of said first hub member;

(c) a coupling unit for torque-transmission between said first hub member and said second hub member having an axial length less than said predetermined axial spacing of said end surface of said second hub member from said end surface of said first hub member to allow said coupling unit to be inserted in radial direction into a gap formed between said end surface of said first hub member and said end surface of said second hub member, said coupling unit including a radially inner torque-transmitting ring engaging said centering shoulder of said first hub member and attached to said first hub member, an intermediate circumferentially compressible torque-transmitting ring of an elastomeric substance, and a radially outer torque-transmitting ring having an axial spacing from said end surface of said second hub member exceeding said predetermined depth in axial direction of said circular shoulder defined by said end surface of said first hub member, said radially outer ring defining a circular centering shoulder at an end surface thereof juxtaposed to said end surface of said second hub member;

(d) circular spacer means arranged between said end surface of said second hub member and said end surface of said radially outer torque-transmitting ring engaging said centering shoulder defined by said end surface of said second hub member and engaging said centering shoulder defined by said end surface of said radially outer ring; and (e) fastener means precluding relative movement between said radially outer ring, said spacer means and said second hub member.

6. A flexible coupling comprising in combination:
(a) a first hub member including an end surface defining a circular centering shoulder having a predetermined depth in axial direction;
(b) a second hub member arranged in coaxial relation to said first hub member and including an end surface juxtaposed to said end surface of said first hub member, said end surface of said second hub member having a predetermined axial spacing from said end surface of said first hub member and defining a plurality of axially extending angularly displaced holes;
(c) a coupling unit for torque-transmission between said first hub member and said second hub member, said unit including a radially inner torque-transmitting ring cooperatively engaging said centering shoulder defined by said first hub member and attached to said first hub member, and intermediate tangentially compressible torque-transmitting ring defining a radially extending void space normally filled-in upon compression of said intermediate ring; and a radially outer torque-transmitting ring comprising a pair of separate ring segments defining a plurality of axially extending angularly displaced holes arranged in registry with said plurality of holes in said second hub member;
(d) clamping means exerting clamping upon said radially outer ring to join said separate ring segments thereof and to compress said intermediate ring;
(e) circularly shaped axial spacer means arranged between said end surface of said second hub member and an end surface of said radially outer ring juxtaposed to said end surface of said second hub member, said axial spacer means defining a plurality of axially extending angularly displaced holes in registry with said holes defined by said second hub member and in registry with said holes defined by said radially outer ring; and
(f) a plurality of screw-threaded studs projecting through said pluralty of holes defined by said second hub member, said plurality of holes defined by said radially outer ring and said plurality of holes defined by said spacer means.

7. A flexible coupling comprising in combination:
(a) a first hub member having a flange defining a circular centering shoulder;
(b) a second hub member arranged in coaxial relation to said first hub member and having a flange juxtaposed to said flange of said first hub member and said flange of said second hub member having a predetermined axial spacing from said flange of said first hub member and defining a centering shoulder and further defining a plurality of axially extending angularly displaced holes;
(c) a coupling unit arranged coaxially to said first hub member and second hub member for torque-transmission between said first hub member and second hub member, said unit having an axial length less than said predetermined axial spacing of said flange of said second hub member from said flange of said first hub member to allow said unit to be inserted radially into a gap formed between said flange of said first hub member and said flange of said second hub member, said unit including a substantially rigid radially inner torque-transmitting ring attached to said flange of said first hub member and engaging said centering shoulder defined by said flange of said first hub member to be centered with regard to said first hub member, an intermediate torque-transmitting ring of an elastomeric substance and a substantially rigid radially outer torque-transmitting ring made-up of a pair of separate ring segments defining a centering shoulder on one end surface thereof and further defining a plurality of axially extending angularly displaced holes arranged in registry with said plurality of holes defined by said flange of said second hub member;
(d) screw stud means projecting through said separate ring segments of said radially outer ring to join said ring segments and to compress said intermediate ring;
(e) circular spacer means arranged between said flange of said second hub member and said radially outer ring engaging said centering shoulder defined by said flange of said second hub member and engaging said centering shoulder defined by said end surface of said radially outer ring, said spacer means defining a plurality of axially extending angularly displaced holes in registry with said plurality of holes defined by said flange of said second hub member and in registry with said plurality of holes defined by said radially outer ring; and
(f) a plurality of screw-threaded studs projecting through said plurality of holes defined by said flange of said second hub member, said plurality of holes defined by said radially outer ring and said plurality of holes defined by said spacer means.

8. A flexible coupling comprising in combination:
(a) a first hub member having an end surface defining a circular centering shoulder;
(b) a second hub member arranged in coaxial relation to said first hub member and having an end surface juxtaposed to said end surface of said first hub member, said end surface of said second hub member having a predetermined axial spacing from said end surface of said first hub member and defining a centering shoulder and further defining a plurality of axially extending angularly displaced holes;
(c) a coupling unit arranged in coaxial relation to said first hub member and second hub member for torque-transmission between said first hub member and said second hub member, said unit having an axial length less than said predetermined axial spacing of said flange of said second hub member from said flange of said first hub member to allow said unit to be inserted radially into a gap formed between said flange of said first hub member and said flange of said second hub member, said unit including a substantially rigid radially inner torque-transmitting ring attached to said flange of said first hub member and engaging said first centering shoulder defined by said flange of said first hub member to be centered with regard to said first hub member, a substantially resilient intermediate torque-transmitting ring, and a radially outer torque-transmitting ring made-up of a pair of separate ring segments defining a centering shoulder on one end surface thereof and further defining a plurality of axially extending angularly displaced holes arranged in registry with said plurality of holes defined by said flange of said second hub member;
(d) screw stud means projecting through said separate ring segments of said radially outer ring to join said ring segments and to compress said intermediate ring;

(e) circular spacer means arranged between said flange of said second hub member and said radially outer ring engaging said centering shoulder defined by said flange of said second hub member and engaging said centering shoulder defined by said end surface of said radially outer ring, said spacer means defining a plurality of axially extending angularly displaced holes in registry with said plurality of holes defined by said flange of said second hub member and in registry with said plurality of holes defined by said radially outer ring; and (f) a plurality of screw-threaded studs projecting through said plurality of holes defined by said flange of said second hub member, said plurality of holes defined by said radially outer ring and said plurality of holes defined by said spacer means.

9. A flexible coupling comprising in combination:

(a) a first hub member having a flange defining a circular centering shoulder and further defining a plurality of axially extending angularly displaced holes;

(b) a second hub member arranged in coaxial relation to said first hub member and having a flange juxtaposed to said flange of said first hub member, said flange of said second hub member having a predetermined axial spacing from said flange of said first hub member and defining a circular centering shoulder and further defining a plurality of axially extending angularly displaced holes;

(c) a coupling unit arranged in coaxial relation to said first hub member and said second hub member for torque-transmission between said first hub member and said second hub member, said unit having an axial length less than said predetermined axial spacing of said flange of said second hub member from said flange of said first hub member to allow said unit to be inserted radially into a gap formed between said flange of said first hub member and said flange of said second hub member, said unit including a substantially rigid radially inner torque-transmitting ring engaging said centering shoulder on said first hub member to be centered with regard to said first hub member and defining a plurality of axially extending angularly displaced holes in registry with said plurality of holes defined by said flange of said first hub member, an intermediate torque-transmitting ring of an elastomeric substance defining when uncompressed substantially V-shaped slots converging radially inwardly and having open radially outer entrances and closed radially inner ends, and a substantially rigid radially outer torque-transmitting ring made-up of a pair of separate ring segments defining a centering shoulder on one end surface thereof and further defining a plurality of axially extending angularly displaced holes arranged in registry with said plurality of holes defined by said flange of said second hub member;

(d) screw stud means projecting through said separate ring segments of said radially outer ring to join said ring segments and to compress said intermediate ring to close said V-shaped slots therein;

(e) circular spacer means arranged between said flange of said second hub member and said radially outer ring engaging said circular centering shoulder defined by said flange of said second hub member and engaging said centering shoulder defined by said end surface of said radially outer ring, said spacer means defining a plurality of axially extending angularly displaced holes in registry with said plurality of holes defined by said flange of said second hub member and in registry with said plurality of holes defined by said radially outer ring;

(f) a first plurality of screw-threaded studs projecting through said plurality of holes defined by said flange of said first hub member and through said plurality of holes defined by said radially inner ring to secure said unit to said first hub member; and (g) a second plurality of screw-threaded studs projecting through said plurality of holes defined by said flange of said second hub member, said plurality of holes defined by said radially outer ring and said plurality of holes defined by said spacer means to secure said unit to said second hub member and to maintain said spacer means in position.

References Cited by the Examiner

UNITED STATES PATENTS

| 2,105,702 | 1/1938 | Scholtze | 64—14 |
| 2,742,769 | 4/1956 | Gleeson et al. | 64—9 |

FOREIGN PATENTS

| 508,069 | 6/1939 | Great Britain. |
| 778,849 | 7/1957 | Great Britain. |

FRED C. MATTERN, Jr., *Primary Examiner.*

H. C. COE, *Assistant Examiner.*